United States Patent [19]

Atkinson

[11] 4,025,855

[45] May 24, 1977

[54] MULTI-CHANNEL R.F. TRANSDUCER WITH CHANNEL SELECTOR COUPLED TO SELECTED CHANNEL FILTER

[75] Inventor: Lowell G. Atkinson, Indianapolis, Ind.

[73] Assignee: General Aviation Electronics, Inc., Indianapolis, Ind.

[22] Filed: Apr. 30, 1976

[21] Appl. No.: 682,108

[52] U.S. Cl. .............................. 325/137; 325/171
[51] Int. Cl.² ...................................... H04B 1/04
[58] Field of Search ............ 325/25, 127, 171, 172, 325/174, 177, 163, 187, 137

[56] References Cited
UNITED STATES PATENTS

| 2,712,061 | 6/1955 | McClellan | 325/163 |
| 3,095,539 | 6/1963 | Bennett et al. | 325/163 |
| 3,129,386 | 4/1964 | Daly | 325/174 |
| 3,413,554 | 11/1968 | Yates et al. | 325/17 |

Primary Examiner—Benedict V. Safourek
Assistant Examiner—Marc E. Bookbinder
Attorney, Agent, or Firm—Gust, Irish, Jeffers & Rickert

[57] ABSTRACT

A voltage variable filter circuit useful, for example, in a radio frequency transmitting device and having a center frequency which is changeable with changes in an applied voltage employs one or more voltage variable reactive elements in the filter in conjunction with circuitry for changing the direct current voltage across such reactive elements to change the reactance thereof and therefore also change the center frequency of the filter. To extend the range of filter variation, additional reactance may be selectively introduced into the filter circuit. In the environment of a multi-channel radio frequency transmitting device, a selector switch simultaneously selects one radio frequency channel for transmission and a unique voltage source for application to the voltage variable reactance so that the filter is appropriately tuned for the selected channel.

8 Claims, 2 Drawing Figures

MULTI-CHANNEL R.F. TRANSDUCER WITH CHANNEL SELECTOR COUPLED TO SELECTED CHANNEL FILTER

BACKGROUND OF THE INVENTION

The present invention relates generally to variable resonant circuits and more particularly to an electrically variable filter circuit. In an exemplary embodiment the electrically tuned filter is employed in a radio frequency transmitting device.

The commercial availability of voltage variable capacitors has given rise to a number of electrically tuned resonant circuits. Thus, for example, electrically variable filters have been employed in intermediate frequency stages of radio receivers. Channel selecting employing electrically varied capacitors has also been accomplished in television receivers.

One drawback of such electrically tuned resonant circuits is that such circuits have a relatively limited range of resonant frequencies due to the limitations on the range of reactance change achievable by the voltage variable capacitor.

The present invention is particularly beneficial in an exemplary specific embodiment of a marine single-sideband transceiver. Such transceivers typically employ plug-in filter strips for each channel which are individually aligned for the appropriate channel. This approach requires considerable space in the radio and many extra components. It is also difficult to align, since often the capacitor value must be selected by trying various fixed values until the proper reponse is obtained.

SUMMARY OF THE INVENTION

Among the several objects of the present invention may be noted the provision of an electrically tuned resonant circuit having an extended range of resonant frequencies; the provision of an electrically variable filter having multiple discrete center frequencies each of which is easily adjusted during servicing of the equipment; the provision of a variable filter for a radio frequency transmitting device wherein the filter center frequency may be changed in unison with changes in the radio frequency channel selected for transmission; and the provision of a radio frequency transmitting device characterized by its ease and economy of manufacture and maintenance.

In general a voltage variable filter circuit has its center frequency changed with changes in an applied voltage and includes one or more voltage variable reactive elements the voltage across which is changed to change the filter center frequency and the filter circuit includes a selectively included additional reactance to increase the range of frequencies through which the filter may be tuned for a specified range of applied voltage variation.

Also, in general, and in one form of the invention, a multi-channel radio frequency transmitting device employs a voltage variable filter circuit, the center frequency of which changes with changes in the radio frequency channel selected for transmission and includes a selector switch for simultaneously selecting one radio frequency channel for transmission and applying a prescribed voltage to a voltage variable reactive means in the filter to change the filter center frequency to be compatible with the selected radio frequency channel.

The following is illustrative of the invention in one form and is not to be construed as limiting in any manner.

DESCRIPTION OF THE PREFERRED EMBODIMENT

Figure 1:
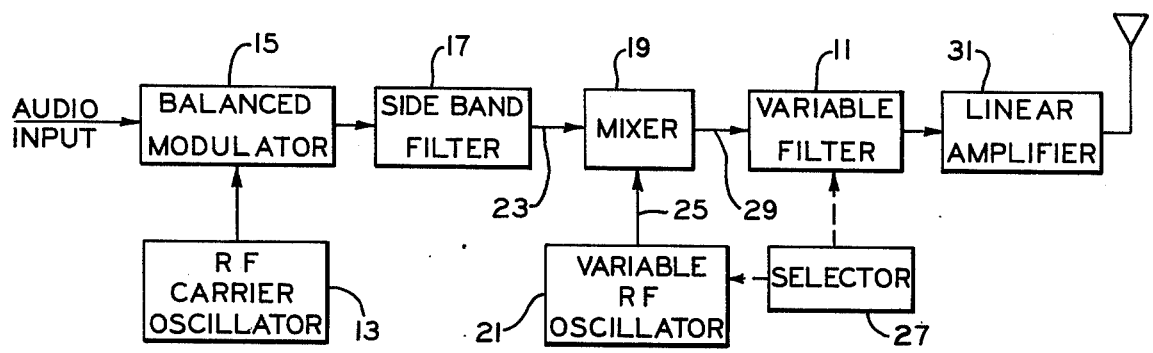
FIG. 1 is a block diagram illustrating a multi-channel radio frequency transmitting device incorporating the present invention.
Figure 2:
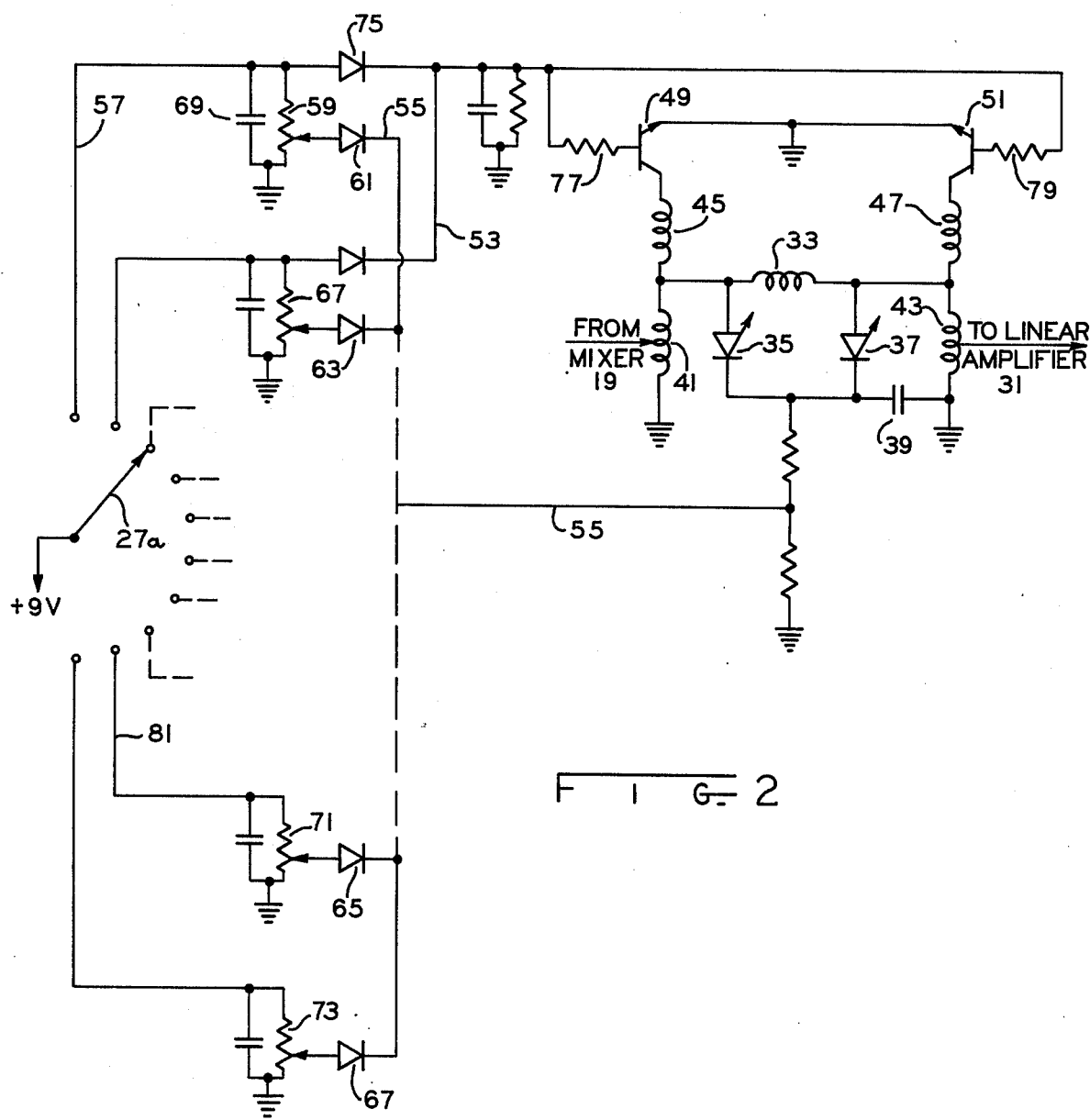
FIG. 2 is a detailed schematic diagram of the variable filter circuit and a portion of the selector of FIG. 1.

As an illustrative environment for the present invention, FIG. 1 shows in block diagram form a single-sideband radio frequency transmitter beneficially employing the variable filter 11 which is illustrated in detail in FIG. 2. In general, the single-sideband transmitter mixes a radio frequency carrier from the oscillator 13 and an audio signal in a balanced modulator 15. Such a balanced modulator or mixer serves to combine the two signals while suppressing the original radio frequency carrier and the original audio input so that the signals supplied to the sideband filter 17 are only two sideband signals, the sum of the radio frequency and audio frequency and the difference of the radio frequency and audio frequency. The sideband filter 17 is tuned to suppress one of these two sideband signals and the other is supplied to a mixer 19. The mixer 19 combines a second radio frequency signal from the oscillator 21 with this single-sideband signal in a manner again to suppress the second radio frequency signal and, in some cases, the original sideband signal so that the output of the mixer as applied to the variable filter 11 is two mixing products, one representing the sum of the frequencies supplied to the mixer 19 and the other representing the difference of the frequencies supplied to the mixer 19, and perhaps also the original sideband signal.

In a preferred exemplary 50 watt single-sideband marine transmitter, the signal on line 23 to the mixer was a 10.7 Mhz signal while the signal supplied on line 25 from the oscillator 21 was operator variable and ranged between 12.7 and 19.7 Mhz as determined by a selector 27. With these frequencies, the signal output from the mixer on line 29 would be in the 2 to 9 Mhz range for the difference mixing product and would be in the 23.4 to 30.4 Mhz range for the additive mixing product. There may additionally be on line 29 some of the original 10.7 Mhz input signal and some of the 12.7 to 19.7 Mhz radio frequency signal from the oscillator 21. The variable filter 11 is accordingly used to eliminate all but the 2 to 9 Mhz range of signals and to supply a particular selected sideband to the linear amplifier 31 for transmission.

Other than the variable filter 11 and selector 27, the elements of FIG. 1 are conventional and need not be discussed further. The variable filter 11 and selector 27 are shown in greater detail in FIG. 2.

The filter itself is configured as a double tuned band pass filter and has the inductor 33 as the coupling element with variable voltage capacitors 35 and 37 connected in parallel with inductors 41 and 43 respectively. A low impedance tap on inductor 41 is the input point from the mixer 19 and a low impedance tap on inductor 43 provides an output point to the linear amplifier. Further reactance in the form of inductors 45 and 47 each in series with a controllable switching device such as transistors 49 and 51 are provided to selectively change the center frequency of the filter. When transistor 49 is enabled to conduct, inductance 45 is essentially placed in parallel with inductor 41 and similarly when transistor 51 conducts, inductance 47 is connected in parallel with inductance 43 to change the center frequency of the filter. These two transistors are enabled when a positive voltage is applied to line 53. The center frequency of the filter is also changed by varying the voltage across the voltage variable capacitors 35 and 37 and this voltage variation is accomplished by corresponding voltage changes on line 55.

A plurality of voltage sources for controlling the transistors 49 and 51 as well as varying the voltage across the voltage variable capacitors (varactors) 35 and 37 are derived from a positive 9 volt direct current source by way of selector switch 27a. This selector switch 27a may, for example, be one portion of a ganged selector switch, another portion of which simultaneously selects a desired crystal or other frequency control element in the variable radio frequency oscillator 21 of FIG. 1. Selector switch 27a connects the 9 volt level to one of 10 different lines only four of which are illustrated in detail and the remaining six of which will be similar to those illustrated with some connecting to line 53 and others not connected to line 53.

For example when switch 27a is connecting the positive 9 volt source to line 57, that voltage is applied to a variable voltage divider 59 which may, for example, be a screw driver actuable potentiometer. The voltage, as determined by the potentiometer setting, is supplied by way of diode 61 to line 55. Similar diodes 63, 65, 67, and others on the lines not shown, function to isolate the voltage divider 59 from other voltage dividers such as 67, 71 and 73. Each voltage divider or potentiometer has a capacitor such as 69 in parallel therewith to act as an RF bypass. Thus, the voltage applied to line 55 is determined by the setting of switch 27a and the particular setting of the voltage divider selected. The voltage dividers such as 59 are advantageously operator inaccessible yet readily accessible during servicing of the device for tuning the filter circuit to the correct center frequency for each radio frequency channel or switch position.

With switch 27a connecting the positive voltage to line 57, the voltages supplied by way of diode 75 and current limiting resistors 77 and 79 render the two transistors 49 and 51 conducting and effectively combine in parallel the reactance of inductors 45 and 47 to the filter circuit. Conduction by these two transistors effectively extends the range of frequencies through which the filter may be tuned by the multi-position switch 27a. It should be noted that voltage dividers such as 71 and 73 have no corresponding diode connected to line 53 so that when the switch 27a is for example connected to line 81, no voltage is applied to the line 53 and transistors 49 and 51 are non-conducting.

In summary a front panel switch on the transmitter is operator actuable to select a desired transmitter frequency and simultaneously to apply a positive voltage to one of the 10 lines such as 57 and 81. For example, if the panel switch is set to a certain transmitter frequency so that the positive voltage is applied to line 81, corresponding diode 65 will be forward biased and a fraction of the positive voltage applied to line 81 as determined by the setting of potentiometer 71 will be supplied to line 55. This fraction of the positive voltage will be employed to bias the diodes 35 and 37 thereby determining the filter center frequency. The 10 potentiometers such as 59, 67, 71 and 73 may be individually adjusted with a screwdriver by a serviceman so as to set the center frequency of the filter 11 for each of the 10 different switch positions. If the transmitter covers a wide range of possible frequencies the range of capacitor variation may be inadequate and thus, for example, if switch 27a connects to line 57, then, in addition to supplying the specific voltage as determined by the setting of potentiometer 59 by way of diode 61 to the voltage variable capacitors, a positive voltage is also supplied by way of diode 75 to turn on transistors 49 and 51 introducing additional inductance 45 and 47 to thereby extend the range of possible variation of the filter center frequency. Only one diode such as 65 or a pair of diodes such as 75 and 61 will be conducting at any time depending on the specific position of the front panel frequency selection switch.

Thus while the present invention has been described with respect to a specific preferred embodiment numerous modifications of the variable circuit filter as well as numerous other environments therefor will readily suggest themselves to those of ordinary skill in the art and accordingly the scope of the present invention is to be measured only by that of the appended claims.

What is claimed is:

1. In a multi-channel radio frequency transmitting device, a voltage variable filter circuit having a center frequency changeable with changes in the radio frequency channel selected for transmission comprising:
    voltage variable reactive means;
    means for changing the voltage across the reactive means to change the reactance thereof and therefore also change the center frequency of the filter including a plurality of voltage sources individually settable to desired levels; and
    selector means for simultaneously selecting one radio frequency channel for transmission and one voltage source for application to the reactive means.

2. The circuit of claim 1 wherein the reactive means comprises a voltage variable capacitor.

3. The circuit of claim 1 further comprising means for selectively introducing an additional reactance into the filter circuit to thereby increase the range of frequencies through which the filter may be tuned for a specified range of applied voltage variation.

4. The circuit of claim 1 further comprising a series connected reactor and controllable switching device, the switching device being enabled to effectively add the reactor to the filter circuit to change the center frequency thereof when certain ones only of the voltage sources are applied to the reactive means.

5. The circuit of claim 1 wherein the selector means comprises a pair of multi-position switches ganged together for simultaneous operation by an operator.

6. The circuit of claim 5 wherein the transmitting device is operable in a single-sideband mode, one switch selecting a transmitter center frequency and the other switch providing a voltage to control the filter to allow only the desired transmitter frequency to be transmitted.

7. The circuit of claim 1 wherein each voltage source comprises a variable voltage divider, a diode, and means for applying a direct current voltage to one only of the voltage sources; the diodes isolating one voltage divider from another and the voltage dividers being operator inaccessible yet readily accessible during servicing of the device for tuning the filter circuit to the correct center frequency for each radio frequency channel.

8. The circuit of claim 7 wherein each voltage divider comprises a screwdriver actuable potentiometer.

* * * * *

UNITED STATES PATENT OFFICE
CERTIFICATE OF CORRECTION

Patent No. 4,025,855     Dated  May 24, 1977

Inventor(s)  Lowell G. Atkinson

It is certified that error appears in the above-identified patent and that said Letters Patent are hereby corrected as shown below:

The title should read:

MULTI-CHANNEL R.F. TRANSMITTER WITH CHANNEL SELECTOR COUPLED TO SELECTED CHANNEL FILTER

Signed and Sealed this ninth Day of August 1977

[SEAL]

Attest:

RUTH C. MASON
Attesting Officer

C. MARSHALL DANN
Commissioner of Patents and Trademarks